(12) United States Patent
Peng et al.

(10) Patent No.: US 12,047,293 B2
(45) Date of Patent: Jul. 23, 2024

(54) PACKET SENDING METHOD, PACKET PROCESSING METHOD, AND DEVICE

(71) Applicant: Huawei Technologies Co., Ltd., Shenzhen (CN)

(72) Inventors: Shuping Peng, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/047,372

(22) Filed: Oct. 18, 2022

(65) Prior Publication Data

US 2023/0053788 A1 Feb. 23, 2023

Related U.S. Application Data

(63) Continuation of application No. PCT/CN2021/111937, filed on Aug. 11, 2021.

(30) Foreign Application Priority Data

Aug. 11, 2020 (CN) .......................... 202010802694.6

(51) Int. Cl.
| | |
|---|---|
| *G06F 15/16* | (2006.01) |
| *H04L 45/00* | (2022.01) |
| *H04L 45/12* | (2022.01) |
| *H04L 45/741* | (2022.01) |
| *H04L 67/52* | (2022.01) |
| *H04L 69/22* | (2022.01) |

(52) U.S. Cl.
CPC .......... *H04L 45/741* (2013.01); *H04L 45/126* (2013.01); *H04L 45/34* (2013.01); *H04L 45/566* (2013.01); *H04L 67/52* (2022.05); *H04L 69/22* (2013.01)

(58) Field of Classification Search
CPC .......... H04L 45/34; H04L 67/52; H04L 69/22
See application file for complete search history.

(56) References Cited

U.S. PATENT DOCUMENTS

| | | | |
|---|---|---|---|
| 2005/0059409 A1* | 3/2005 | Vare ........................ | H04W 4/02 |
| | | | 455/456.1 |
| 2007/0123273 A1 | 5/2007 | Vare et al. | |
| 2012/0047572 A1 | 2/2012 | Duncan et al. | |
| 2020/0099611 A1* | 3/2020 | Filsfils .................... | H04L 43/10 |

(Continued)

FOREIGN PATENT DOCUMENTS

| | | |
|---|---|---|
| CN | 102546248 A | 7/2012 |
| CN | 107276902 A | 10/2017 |
| WO | 2020048493 A1 | 3/2020 |

OTHER PUBLICATIONS

Deering et al., Internet Protocol, Version 6 (IPv6) Specification, 1998, p. 1-39. (Year: 1998).*

(Continued)

*Primary Examiner* — Hieu T Hoang
(74) *Attorney, Agent, or Firm* — Slater Matsil, LLP (57) ABSTRACT

A packet sending method includes: A first device obtains geographical location information of the first device, and generates a first Internet Protocol version 6 IPv6 packet, where the first IPv6 packet carries the geographical location information of the first device; and the first device sends the first IPv6 packet.

17 Claims, 6 Drawing Sheets

(56) References Cited

U.S. PATENT DOCUMENTS

2021/0126831 A1* 4/2021 Filsfils .................. H04W 76/12
2023/0155926 A1* 5/2023 Filsfils .................. H04L 45/302
370/392

OTHER PUBLICATIONS

Alibaba Cloud Singapore_ Cloud Computing Services, https://sg.alibabacloud.com/, 2009, 3 pages.
Cjjky, Internet Blog, "Get the latitude and longitude of the current location through GPS or NetWork in Android", https://blog.csdn.net/cjky/article/details/6557561, Posted Jun. 21, 2011, 2 pages.

* cited by examiner

PACKET SENDING METHOD, PACKET PROCESSING METHOD, AND DEVICE

CROSS-REFERENCE TO RELATED APPLICATIONS

This application is a continuation of International Application No. PCT/CN2021/111937, filed on Aug. 11, 2021, which claims priority to Chinese Patent Application No. 202010802694.6, filed on Aug. 11, 2020. The disclosures of the aforementioned applications are hereby incorporated by reference in their entireties.

TECHNICAL FIELD

This application relates to the communication field, and in particular, to a packet sending method, a packet processing method, and a device.

BACKGROUND

In the current technology, a device may obtain geographical location information of the device by positioning the device by using a global positioning system (GPS). The geographical location information reflects a geographical location of the device. However, with the expansion of a communication service or an Internet service, not only the device, but also another device requires the geographical location information of the device. Therefore, how to transmit the geographical location information of the device to another device is a technical problem that needs to be resolved currently.

SUMMARY

Embodiments of this application provide a packet sending method, a packet processing method, and a device, so that the device can transmit geographical location information of the device to another device.

According to a first aspect, a packet sending method is provided. The method may be performed by a first device, and the first device may be a terminal device, a server, or the like. The method specifically includes the following steps. The first device obtains geographical location information of the first device, and generates a first Internet Protocol version 6 (IPv6) packet, where the first IPv6 packet carries the geographical location information of the first device. The geographical location information of the first device identifies a geographical location of the first device. For example, the geographical location information may be one or more of latitude and longitude of the first device, an identifier of an area in which the first device is located, or the like. The area in which the first device is located may be an administrative division in which the first device is located, for example, a country, a province, a city, a district, a county, a township, or a village, or may be a non-administrative division, for example, a street or a cell. After generating the first IPv6 packet, the first device sends the first IPv6 packet, so that another device receives the first IPv6 packet and obtains the geographical location information of the first device from the first IPv6 packet.

In a possible design, the geographical location information of the first device is carried in an extension header of the first IPv6 packet. The extension header may include one or more of a hop-by-hop options header (HBH), a destination options header (DOH), a segment routing header (SRH), and the like.

When the geographical location information of the first device is carried in the HBH or DOH of the first IPv6 packet, the geographical location information of the first device may be specifically carried in an HBH type-length-value (TLV) or a DOH TLV of the first IPv6 packet.

When the geographical location information of the first device is carried in the SRH of the first IPv6 packet, the geographical location information of the first device may be specifically carried in a TLV, a tag field, or a segment identifier (SID) of the SRH.

In a possible design, the geographical location information of the first device may be specifically carried in an arguments field of the SID of the SRH.

According to a second aspect, a packet processing method is provided. The method is performed by a second device, and the second device may be a terminal device, a server, or a network device. The packet processing method includes the following steps: A second device obtains a first IPv6 packet or a multi-protocol label switching (MPLS) packet, where the first IPv6 packet or the MPLS packet carries geographical location information of a first device. For description of the geographical location information of the first device, refer to the foregoing description. Details are not described herein again. Then, the second device processes the first IPv6 packet or the MPLS packet. In other words, the second device can obtain the first IPv6 packet or the MPLS packet that includes the geographical location information of the first device, so that the geographical location information of the first device can be obtained by another device.

For a specific location of the geographical location information of the first device in the first IPv6 packet, refer to the description of the first aspect. Details are not described herein again.

In a possible design, that a second device obtains a first IPv6 packet includes: The second device receives a second IPv6 packet from the first device, where the second IPv6 packet includes an IP address of the first device. The second device obtains the geographical location information of the first device based on the IP address of the first device, and uses the second IPv6 packet to carry the geographical location information of the first device, to obtain the first IPv6 packet. After obtaining the first IPv6 packet, the second device may send the first IPv6 packet, so that another device can obtain the first IPv6 packet, to obtain the geographical location information of the first device from the first IPv6 packet.

In a possible design, that a second device obtains a first MPLS packet includes: The second device receives an Internet Protocol IP packet from the first device, where the IP packet includes an IP address of the first device. The second device obtains the geographical location information of the first device based on the IP address of the first device. The second device encapsulates a label stack outside the IP packet to obtain the MPLS packet, where the label stack includes the geographical location information of the first device. After obtaining the MPLS packet, the second device may send the MPLS packet, so that another device can obtain the MPLS packet, to obtain the geographical location information of the first device from the MPLS packet.

In a possible design, the geographical location information of the first device is located at the bottom of the label stack.

In a possible design, in addition to sending of the first IPv6 packet or the MPLS packet to another device, the second device may further process the first IPv6 packet or the MPLS packet in the following two specific implementations: The second device pushes corresponding preset information to the first device based on the geographical location information of the first device, for example, an advertisement, and information such as news, entertainment information, and life information; or the second device forwards the first IPv6 packet or the MPLS packet to a domain name system (DNS) or a content delivery network (CDN) server corresponding to the geographical location information of the first device, so that the first device accesses the DNS or the CDN server. Certainly, the foregoing several manners in which the second device processes the first IPv6 packet or the MPLS packet do not constitute a limitation on the technical solutions of this application. A person skilled in the art may design the technical solutions according to an actual case.

According to a third aspect, a first device is provided. The first device includes: a processing unit, configured to obtain geographical location information of the first device, and generate a first Internet Protocol version 6 IPv6 packet, where the first IPv6 packet carries the geographical location information of the first device; and a sending unit, configured to send the first IPv6 packet.

For content of the geographical location information of the first device and the specific location of the geographical location information of the first device in the first IPv6 packet, refer to the description of the first aspect. Details are not described herein again.

According to a fourth aspect, a second device is provided. The second device includes: an obtaining unit, configured to obtain a first Internet Protocol version 6 IPv6 packet or a multi-protocol label switching MPLS packet, where the first IPv6 packet or the MPLS packet carries geographical location information of a first device; and a processing unit, configured to process the first IPv6 packet or the MPLS packet.

In a possible design, the obtaining unit is configured to: receive a second IPv6 packet from the first device, where the second IPv6 packet includes an IP address of the first device; obtain the geographical location information of the first device based on the IP address of the first device; and use the second IPv6 packet to carry the geographical location information of the first device, to obtain the first IPv6 packet.

In a possible design, the obtaining unit is configured to: receive an Internet Protocol IP packet from the first device, where the IP packet includes an IP address of the first device; obtain the geographical location information of the first device based on the IP address of the first device; and encapsulate a label stack outside the IP packet to obtain the MPLS packet, where the label stack includes the geographical location information of the first device.

In a possible design, the geographical location information of the first device is located at the bottom of the label stack.

In a possible design, the processing unit is configured to push corresponding preset information to the first device based on the geographical location information of the first device; or forward the first IPv6 packet or the MPLS packet to a domain name system DNS or a content delivery network CDN server corresponding to the geographical location information of the first device.

According to a fifth aspect, a network system is provided, where the network system includes the first device according to the third aspect and the second device according to the fourth aspect.

According to a sixth aspect, a computer-readable storage medium is provided, including instructions, a program, or code. When the instructions, program, or code is executed on a computer, the computer is enabled to perform the method according to any one of the possible designs of the first aspect or the second aspect.

According to a seventh aspect, a computer program product including computer instructions is provided. When the computer program product is run on a network device, the network device is enabled to perform the method according to any one of the possible designs of the first aspect or the second aspect.

According to an eighth aspect, a chip is provided, including a memory and a processor. The memory is configured to store instructions or program code, and the processor is configured to invoke the instructions or program code from the memory and execute the instructions or program code, to perform the method in any one of the first aspect or the possible designs of the first aspect, or perform the method in any one of the second aspect or the possible designs of the second aspect.

In a possible design, the chip includes only the processor, and the processor is configured to read and execute instructions or program code stored in a memory. When the instructions or program code are/is executed, the processor performs the method in any one of the first aspect or the possible designs of the first aspect, or performs the method in any one of the second aspect or the possible designs of the second aspect.

DETAILED DESCRIPTION OF ILLUSTRATIVE EMBODIMENTS

Embodiments of this application provide a packet sending and processing method, to achieve an objective of transmitting geographical location information of a device over a network.

Before the packet sending and processing method provided in the embodiments of this application is described, an example of a network architecture to which the method may be applicable is first described.

Figure 1:
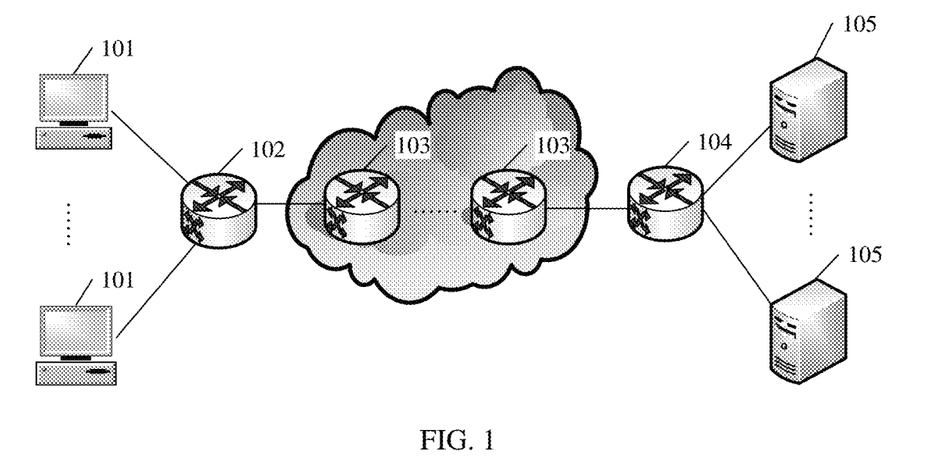
FIG. 1 is a schematic diagram of a structure of a network architecture according to an embodiment of this application.

FIG. 1 is a schematic diagram of a structure of a network architecture according to an embodiment of this application.

In FIG. 1, the network architecture includes one or more terminal devices 101, and an access device 102 configured to connect the one or more terminal devices 101 to an IP network, where the IP network includes a plurality of network devices 103. The network architecture further includes one or more servers 105, and an access device 104 connected between the one or more servers 105 and the IP network.

In this embodiment of this application, the terminal device 101 may also be referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a desktop computer, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, a 5G-residential gateway (5G-RG), or the like.

The access device 102, the network device 103, and the access device 104 may be forwarding devices such as a router or a switch, and are configured to forward an IPv6 packet between the terminal device 101 and the server 105.

Figure 2:
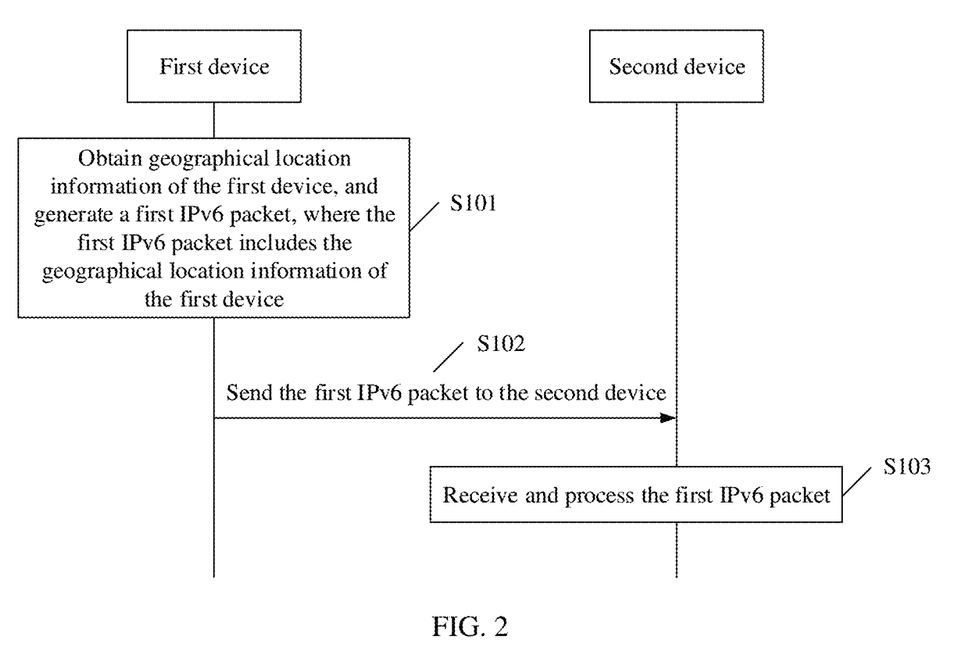
FIG. 2 is a flowchart of a packet sending and processing method according to an embodiment of this application.

FIG. 2 is a flowchart of a packet sending and processing method according to an embodiment of this application.

The following describes the packet sending and processing method provided in an embodiment of this application with reference to FIG. 1 and FIG. 2. The method includes the following steps.

S101: A first device obtains geographical location information of the first device, and generates a first IPv6 packet, where the first IPv6 packet includes the geographical location information of the first device.

S102: The first device sends the first IPv6 packet to a second device.

In this embodiment of this application, the first device may be the terminal device 101 in the embodiment shown in FIG. 1. Certainly, the first device may alternatively be a server or the like. This is not specifically limited in this embodiment of this application. The second device may be the access device 102, the network device 103, the access device 104, or the server 105 in the embodiment shown in FIG. 1. Certainly, the second device may alternatively be a terminal device or the like. This is not specifically limited in this embodiment of this application.

In this embodiment of this application, the first device may obtain the geographical location information of the first device, where the geographical location information identifies a geographical location of the first device. For example, the geographical location information may be one or more of latitude and longitude of the first device, an identifier of an area in which the first device is located, or the like. The area in which the first device is located may be an administrative division in which the first device is located, for example, a country, a province, a city, a district, a county, a township, or a village, or may be a non-administrative division, for example, a street or a cell.

The first device obtains the geographical location information of the first device in a plurality of manners. For example, if an Android system is loaded on the first device, the first device may obtain the longitude and latitude of the first device by using an installed global positioning system (GPS) or NetWork (a type of positioning software). Alternatively, the first device may obtain the geographical location information based on an IP address of the first device. Specifically, the first device may parse the IP address of the first device to obtain the geographical location information, or may send the IP address of the first device to another device such as a server or a network device, so that the another device such as the server or the network device parses the IP address of the first device to obtain the corresponding geographical location information, and returns the geographical location information to the first device. For example, when the first device is the terminal device 101 in FIG. 1, the another device that parses the IP address of the first device may be the access device 102, the network device 103, or the access device 104.

Certainly, the first device may alternatively obtain the geographical location information of the first device in another manner. This is not specifically limited in this embodiment of this application. In addition, an implementation of how to parse the IP address to obtain the corresponding geographical location information belongs to a mature technology, and details are not described herein again.

In this embodiment of this application, the first device may use the first IPv6 packet that is sent to the second device to carry the geographical location information of the first device, so that the second device processes the first IPv6 packet.

Figure 3:
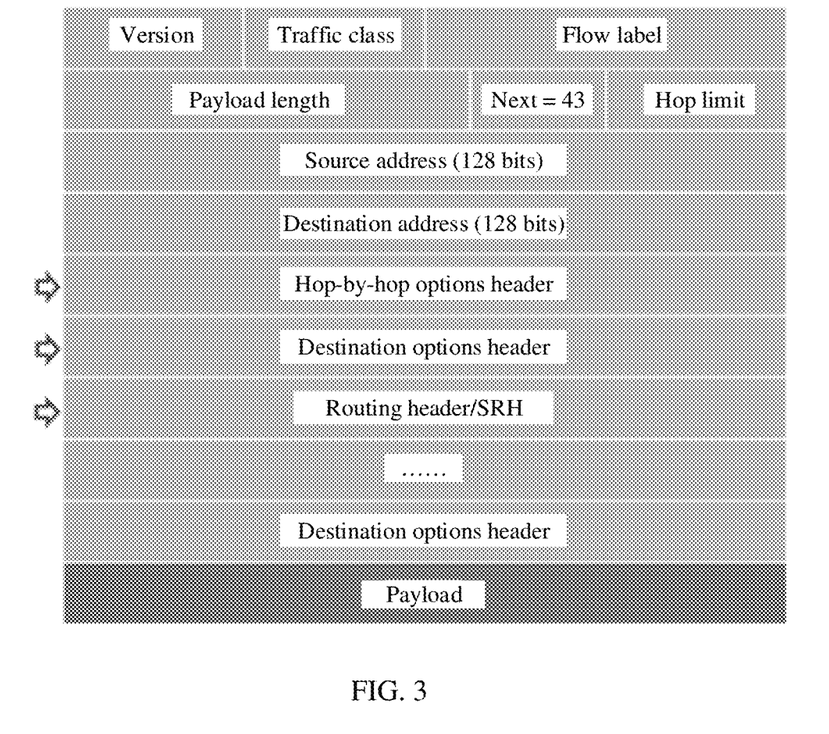
FIG. 3 is a schematic diagram of a format of an IPv6 packet according to an embodiment of this application.

In this embodiment of this application, the geographical location information of the first device may be carried in an extension header of the first IPv6 packet. FIG. 3 is a schematic diagram of a format of an IPv6 packet. In FIG. 3, the IPv6 packet includes a basic header, an extension header (EH), and a payload. The basic header includes a version field, a traffic class field, a flow label field, a payload length field, a next header field (for example, a value of 43), a hop limit field, a source address field, and a destination address field. The extension header includes a hop-by-hop options header (HBH), a destination address options header (DOH), a routing header (which may be a segment routing header (SRH) if the packet is a segment routing version 6 (SRv6) packet), and the like.

In a first possible implementation, the geographical location information of the first device is carried in the HBH of the first IPv6 packet. Specifically, the geographical location information of the first device may be carried in an HBH type-length-value (TLV). According to the definition of a format of the HBH TLV in RFC 8200, the TLV includes an options type field, an options data length field, and an options data field. A value of the option type field is used to indicate that the TLV is a TLV that carries the geographical location information of the first device, a value of the option data length field is a length of the TLV, and a value of the option data field includes the geographical location information of the first device.

In a second possible implementation, the geographical location information of the first device is carried in the DOH of the first IPv6 packet. Specifically, the geographical location information of the first device may be carried in a DOH TLV. For a format of the TLV, refer to the format of the HBH TLV. Details are not described herein again.

In a third possible implementation, when the first IPv6 packet is an SRv6 packet, the geographical location information of the first device is carried in the SRH of the SRv6 packet.

Figure 4:
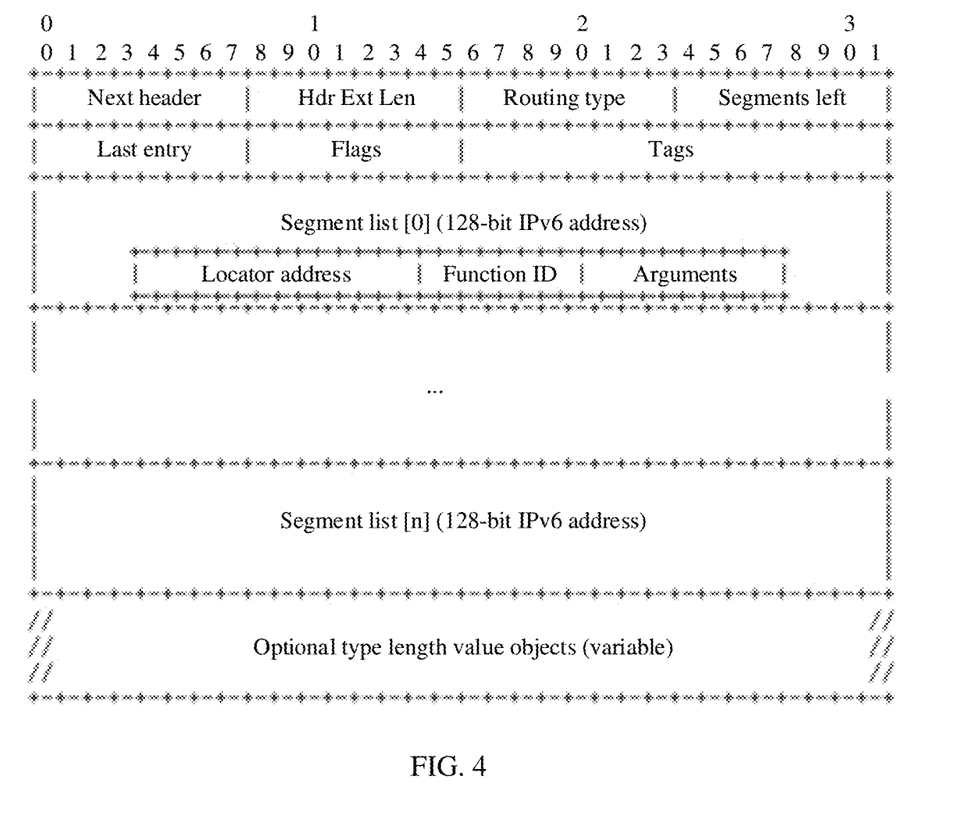
FIG. 4 is a schematic diagram of a format of an SRH according to an embodiment of this application.

FIG. 4 is a schematic diagram of a format of an SRH. In FIG. 4, the SRH includes a next header field, an SRH length (Hdr Ext Len) field, a routing type, a segment left field, a last entry field, a flags field, a tag field, a segment list (128-bit IPv6 address), and an optional TLV objects field.

The geographical location information of the first device may be carried in the optional TLV field in FIG. 4. Based on the definition of a format of an SRH TLV in RFC 8754, the TLV includes a type field, a length field, and a variable-length data field, where a value of the type field is used to indicate that the TLV is a TLV that carries the geographical location information of the first device, and a value of the length field is a length of the TLV. The variable-length data field is used to carry the geographical location information of the first device.

The geographical location information of the first device may further be carried in a segment identification (SID) field in the segment list, or the tag field in FIG. 4. The SID field includes a locator address field, a function identifier (function ID) field, and an arguments field. The arguments field may be used to carry the geographical location information of the first device.

The foregoing three possible implementations do not constitute a limitation on the technical solutions of this application, and a person skilled in the art may design the technical solutions based on an actual case.

S103: The second device receives and processes the first IPv6 packet.

In this embodiment of this application, the second device may process the first IPv6 packet in a plurality of implementations.

In a first possible implementation, if the second device is not a destination device of the first IPv6 packet, the second device may forward the first IPv6 packet to the destination device, so that the destination device can receive the first IPv6 packet and obtain the geographical location information of the first device.

FIG. 1 is used as an example. The terminal device 101 may send an IPv6 packet P1 to the access device 102, where the IPv6 packet P1 carries geographical location information of the terminal device 101, and a destination device of the IPv6 packet P1 is the server 105. After receiving the IPv6 packet P1 from the terminal device 101, the access device 102 sends the IPv6 packet P1 to the network device 103 according to a destination address (an IP address of the destination device) of the IPv6 packet P1. After receiving the IPv6 packet P1 from the access device 102, the network device 103 sends the IPv6 packet P1 to the access device 104 according to the destination address of the IPv6 packet P1. After receiving the IPv6 packet P1 from the network device 103, the access device 104 sends the IPv6 packet P1 to the server 105 according to the destination address of the IPv6 packet P1. Therefore, the server 105 may obtain the geographical location information of the terminal device 101 from the IPv6 packet P1.

In a second possible implementation, after receiving the first IPv6 packet, the second device may obtain the geographical location information of the first device from the first IPv6 packet, and perform corresponding processing by using the geographical location information of the first device. In this implementation, the second device may be or may not be a destination device of the first IPv6 packet.

For example, if the second device is the destination device of the first IPv6 packet, for example, the server 105 in the embodiment shown in FIG. 1, the second device may deliver an advertisement or push information such as news, entertainment information, and life information to the first device based on the geographical location information of the first device, so that a user of the first device can obtain a corresponding service.

If the second device is not the destination device of the first IPv6 packet, the second device may forward the first IPv6 packet to the destination device after performing corresponding processing based on the geographical location information of the first device.

For example, if the first IPv6 packet needs to access a domain name system (DNS) or a content delivery network (CDN) device, after receiving the first IPv6 packet, as a device on a forwarding path of the first IPv6 packet, the second device forwards, based on the geographical location information of the first device, the first IPv6 packet to the DNS or CDN device corresponding to the geographical location information, to save network resources. The meaning of "corresponding" may be, for example, close to each other, belong to a same area, or the like.

Figure 5:
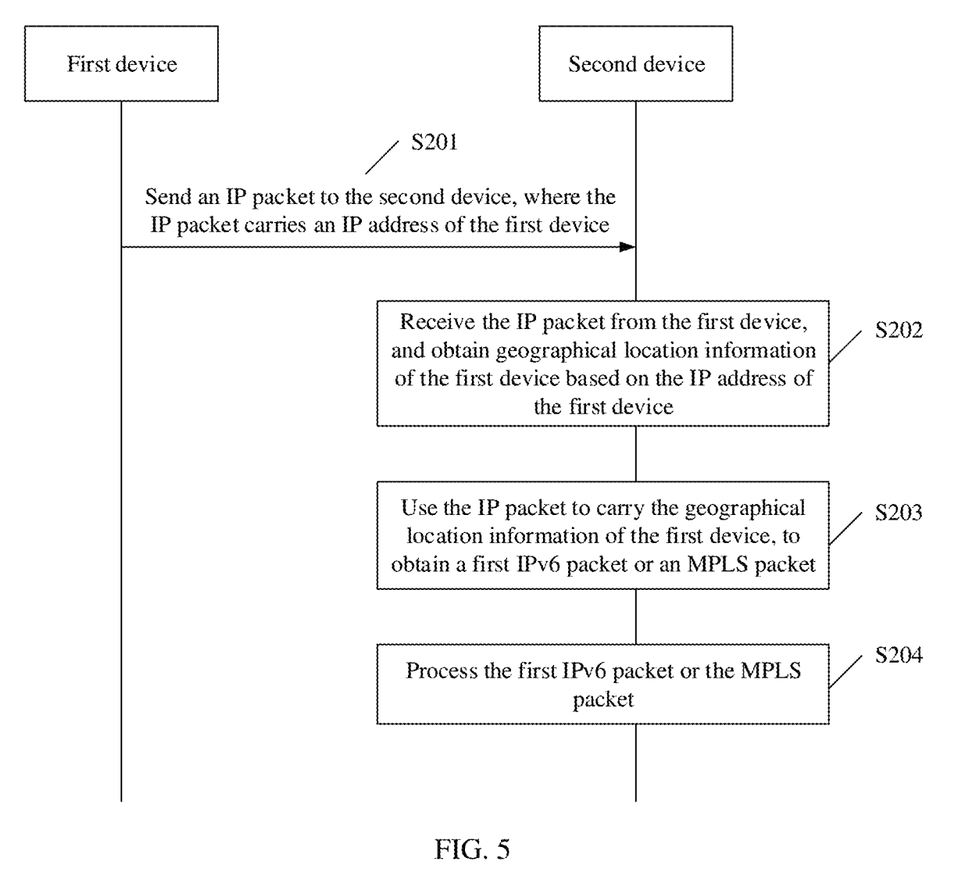
FIG. 5 is a flowchart of another packet sending and processing method according to an embodiment of this application.

FIG. 5 is a flowchart of another packet sending and processing method according to an embodiment of this application.

The following describes the packet sending and processing method provided in an embodiment of this application with reference to FIG. 1 and FIG. 5. The method includes the following steps.

S201: A first device sends an IP packet to a second device, where the IP packet carries an IP address of the first device.

In this embodiment of this application, the IP packet sent by the first device may be an IPv6 packet, or may be an Internet Protocol version 4 (IPv4) packet. The IP packet carries the IP address of the first device, but does not carry geographical location information of the first device.

For example, the IP packet is an IPv6 packet. For a format of the IPv6 packet, refer to FIG. 3. The IP address of the first device may be carried in a source address field of the IPv6 packet.

In this embodiment of this application, the first device may be, for example, the terminal device 101 in FIG. 1. Certainly, the first device may also be a server or the like. This is not specifically limited in this embodiment of this application. The second device may be the access device 102, the network device 103, or the access device 104 in the embodiment shown in FIG. 1. The terminal device 101 may send an IP packet P2 to the access device 102, where the IP packet P2 carries an IP address of the terminal device 101.

S202: A second device receives the IP packet from the first device, and obtains the geographical location information of the first device based on the IP address of the first device.

In this embodiment of this application, the second device may obtain the geographical location information of the first device based on the IP address of the first device in the IP packet.

Specifically, the second device may parse the IP address of the first device to obtain the geographical location information of the first device. For example, after receiving the IP packet P2 from the terminal device 101, the access device 102 obtains the IP address of the terminal device 101 from the IP packet P2, and then parses the IP address of the terminal device 101 to obtain geographical location information of the terminal device 101.

Alternatively, the second device may send the IP address of the first device to a server used for address parsing, and the server parses the IP address of the first device, and returns the geographical location information of the first device that is obtained through parsing to the network device. Alternatively, the second device may pre-store a correspondence between the IP address of the first device and the geographical location information of the first device. After obtaining the IP packet from the first device, the second device may obtain the geographical location information of the first device based on the IP address and the correspondence in the IP packet. Certainly, the foregoing three possible implementations do not constitute a limitation on the technical solutions of this application, and a person skilled in the art may further design the technical solutions based on an actual case.

S203: The second device uses the IP packet to carry the geographical location information of the first device, to obtain a first IPv6 packet or an MPLS packet.

In this embodiment of this application, if the IP packet P2 is an IPv6 packet, after obtaining the geographical location information of the terminal device 101, the access device 102 uses the IP packet P2 to carry the geographical location information of the terminal device 101, to obtain an IPv6 packet P3, and then forwards the IPv6 packet P3 to a next-hop network device (that is, the network device 103) based on a destination address of the IPv6 packet P3, that is, an IP address of the server 105. After receiving the IPv6 packet P3, the network device 103 sends the IPv6 packet P3 to the access device 104 according to the destination address of the IPv6 packet P3, so that the access device 104 can forward the IPv6 packet P3 to the server 105, and the server 105 can obtain the geographical location information of the terminal device 101 from the IPv6 packet P3.

In this embodiment of this application, if the IP packet P2 is an IPv6 packet, for a specific location that is in the first IPv6 packet and in which the geographical location information of the first device is carried, refer to the foregoing description. Details are not described herein again.

In this embodiment of this application, the IP packet P2 is an IPv6 packet or an IPv4 packet, and the second device is a network device in an MPLS network. In this case, after receiving the IP packet P2 from the first device, the second device may encapsulate a label stack outside the IP packet P2 to obtain the MPLS packet, where the label stack includes a label corresponding to a packet forwarding path of the IP packet P2. In this scenario, the label stack of the MPLS packet may carry the geographical location information of the first device. Optionally, the geographical location information of the first device may be located at the bottom of the label stack, so that the last device on the packet forwarding path can obtain the geographical location information of the first device. Certainly, the geographical location information of the first device may alternatively be located at another location of the MPLS packet. This is not specifically limited in this embodiment of this application. In addition, for specific implementation in which the second device processes the first IPv6 packet or the MPLS packet, refer to related descriptions of processing the first IPv6 packet in the embodiment shown in FIG. 2. Details are not described herein again.

S204: The second device processes the first IPv6 packet or the MPLS packet.

In this embodiment of this application, the second device may forward the first IPv6 packet or the MPLS packet, so that another device can also obtain the geographical location information of the first device from the first IPv6 packet or the MPLS packet, to implement diffusion of the geographical location information of the first device in a network.

Figure 6:
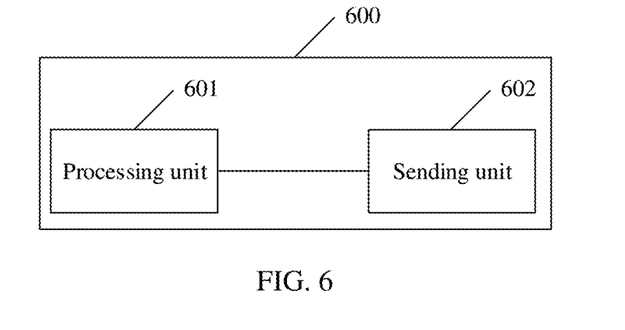
FIG. 6 is a schematic diagram of a structure of a first device 600 according to an embodiment of this application.

FIG. 6 is a schematic diagram of a possible structure of the first device in the foregoing embodiment. The first device 600 may implement a function of the first device in the embodiment shown in FIG. 2. Refer to FIG. 6. The first device 600 includes a processing unit 601 and a sending unit 602. These units may perform the corresponding function of the first device in the embodiment shown in FIG. 2. The processing unit 601 is configured to support the first device 600 in performing S101 in FIG. 2, and the sending unit 602 is configured to support the first device 600 in performing S102 in FIG. 2, and/or another process performed by the first device in the technology described in this specification. For example, the processing unit 601 is configured to obtain geographical location information of the first device, and generate a first Internet Protocol version 6 IPv6 packet, where the first IPv6 packet carries the geographical location information of the first device. The sending unit 602 is configured to send the first IPv6 packet. For a specific execution process, refer to the detailed descriptions of corresponding steps in the embodiment shown in FIG. 2. Details are not described herein again.

It should be noted that, in the embodiments of this application, division into the units is an example and merely logical function division, and may be other division in an actual implementation. Functional units in the embodiments of this application may be integrated into one processing unit, or each unit may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 7:
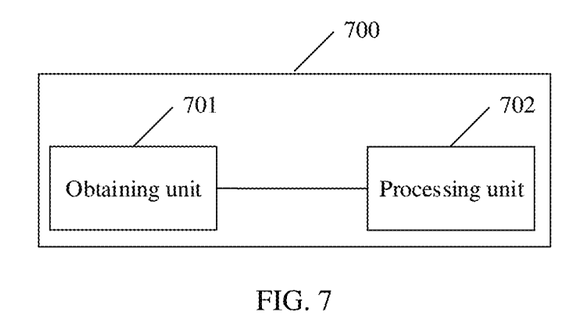
FIG. 7 is a schematic diagram of a structure of a second device 700 according to an embodiment of this application.

FIG. 7 is a schematic diagram of a possible structure of the second device in the foregoing embodiment. The second device 700 may implement a function of the second device in the embodiment shown in FIG. 2. Refer to FIG. 7. The second device 700 includes an obtaining unit 701 and a processing unit 702. These units may perform the corresponding function of the second device in the embodiment shown in FIG. 2 or the second device in the embodiment shown in FIG. 5. The obtaining unit 701 is configured to support the second device 700 in performing S103 in FIG. 2 or S202 and S203 in FIG. 5, and the processing unit 702 is configured to support the second device 700 in performing S103 in FIG. 2 or S204 in FIG. 5, and/or another process performed by the second device in the technology described in this specification. For example, the obtaining unit 701 is configured to obtain a first IPv6 packet or an MPLS packet, where the first IPv6 packet or the MPLS packet carries geographical location information of a first device. The processing unit 702 is configured to process the first IPv6 packet or the MPLS packet. For a specific execution process, refer to the detailed descriptions of corresponding steps in the embodiment shown in FIG. 4. Details are not described herein again.

It should be noted that, in the embodiments of this application, division into the units is an example and merely logical function division, and may be other division in an actual implementation. Functional units in the embodiments of this application may be integrated into one processing unit, or each unit may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 8:
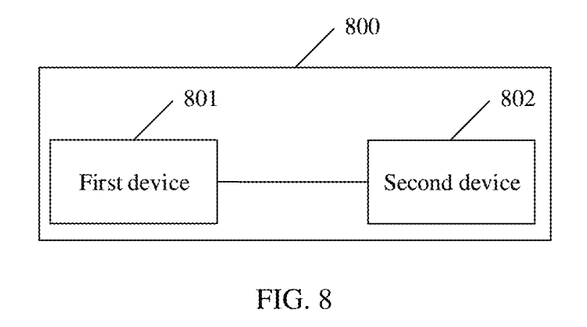
FIG. 8 is a schematic diagram of a structure of a network system 800 according to an embodiment of this application.

Refer to FIG. 8. An embodiment of the present invention provides a network system 800. The system 800 is configured to implement the packet sending method and the packet processing method in the foregoing method embodiments. The system 800 includes a first device 801 and a second device 802. The first device 801 can implement a function of the first device in the embodiment shown in FIG. 2 or the first device 600 in FIG. 6, and the second device 802 can implement a function of the second device in the embodiment shown in FIG. 2, the second device in the embodiment shown in FIG. 5, or the second device 700 in FIG. 7. For a specific execution process, refer to detailed descriptions of corresponding steps in the embodiments shown in FIG. 2, FIG. 5, FIG. 6, or FIG. 7. Details are not described herein again.

Figure 9:
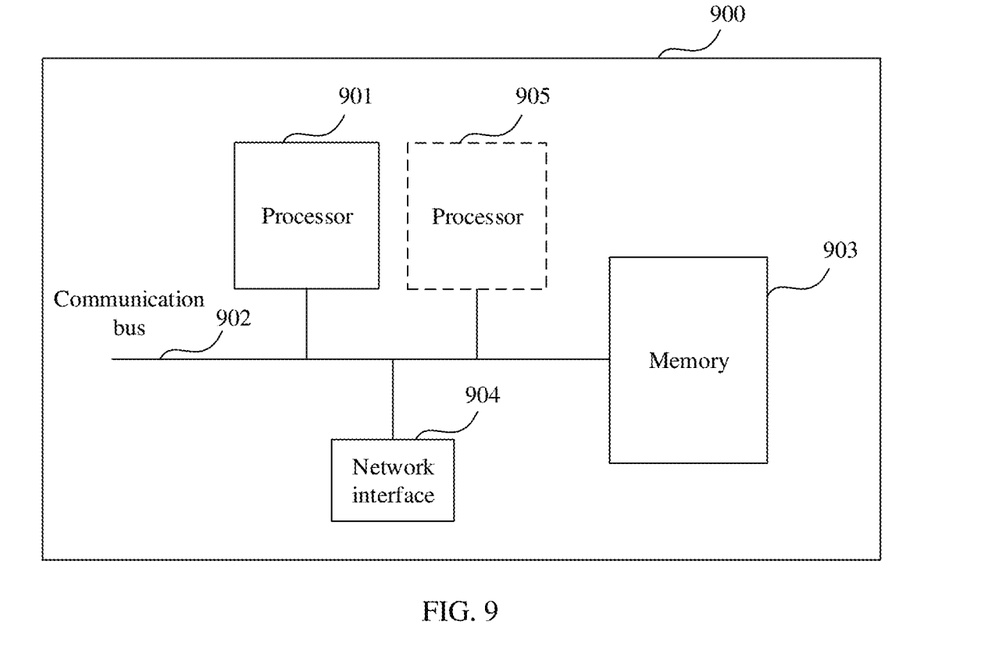
FIG. 9 is a schematic diagram of a structure of a device 900 according to an embodiment of this application.

FIG. 9 is a schematic diagram of a structure of a device 900 according to an embodiment of this application. The first device boo in FIG. 6 and the second device 700 in FIG. 7 may be implemented by using the device shown in FIG. 9. Refer to FIG. 9. The device 900 includes at least one processor 901, a communication bus 902, and at least one network interface 904. Optionally, the device 900 may further include a memory 903.

The processor 901 may be a general-purpose central processing unit (CPU), an application-specific integrated circuit (ASIC), or one or more integrated circuits (IC) configured to control program execution of solutions of this application. The processor may be configured to process a packet, to implement the packet sending method provided in the embodiments of this application.

For example, when the first device 600 in FIG. 6 is implemented by using the device shown in FIG. 9, the processor may be configured to obtain geographical location information of the first device, and generate a first Internet Protocol version 6 IPv6 packet, where the first IPv6 packet carries the geographical location information of the first device. For specific function implementation, refer to the processing corresponding to the first device in the method embodiment shown in FIG. 2. For another example, when the second device in FIG. 7 is implemented by using the device shown in FIG. 9, the processor may be configured to: obtain a first IPv6 packet or an MPLS packet, where the first IPv6 packet or the MPLS packet carries geographical location information of the first device; and process the first IPv6 packet or the MPLS packet. For specific function implementation, refer to the processing performed by the second device in the method embodiment shown in FIG. 5.

The communication bus 902 is configured to transfer information between the processor 901, the network interface 904, and the memory 903.

The memory 903 may be a read-only memory (ROM) or another type of static storage device that may store static information and instructions. The memory 903 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and can be accessed by a computer. However, the memory 903 is not limited thereto. The memory 903 may exist independently, and is connected to the processor 901 through the communication bus 902. Alternatively, the memory 903 may be integrated with the processor 901.

Optionally, the memory 903 is configured to store program code or instructions for executing the solutions of this application, and the processor 901 controls the execution. The processor 901 is configured to execute the program code or instructions stored in the memory 903. The program code may include one or more software modules. Optionally, the processor 901 may alternatively store the program code or instructions for executing the solutions of this application. In this case, the processor 901 does not need to read the program code or instructions from the memory 903.

The network interface 904 may be an apparatus such as a transceiver, and is configured to communicate with another device or a communication network. The communication network may be Ethernet, a radio access network (RAN), wireless local area networks (WLAN), or the like. In this embodiment of this application, the network interface 904 may be configured to receive a packet sent by another node in a segment routing network, or send a packet to another node in the segment routing network. The network interface 904 may be an Ethernet interface, a fast Ethernet (FE) interface, a gigabit Ethernet (GE) interface, or the like.

In specific implementation, in an embodiment, the device 900 may include a plurality of processors, for example, the processor 901 and a processor 405 shown in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

Figure 10:
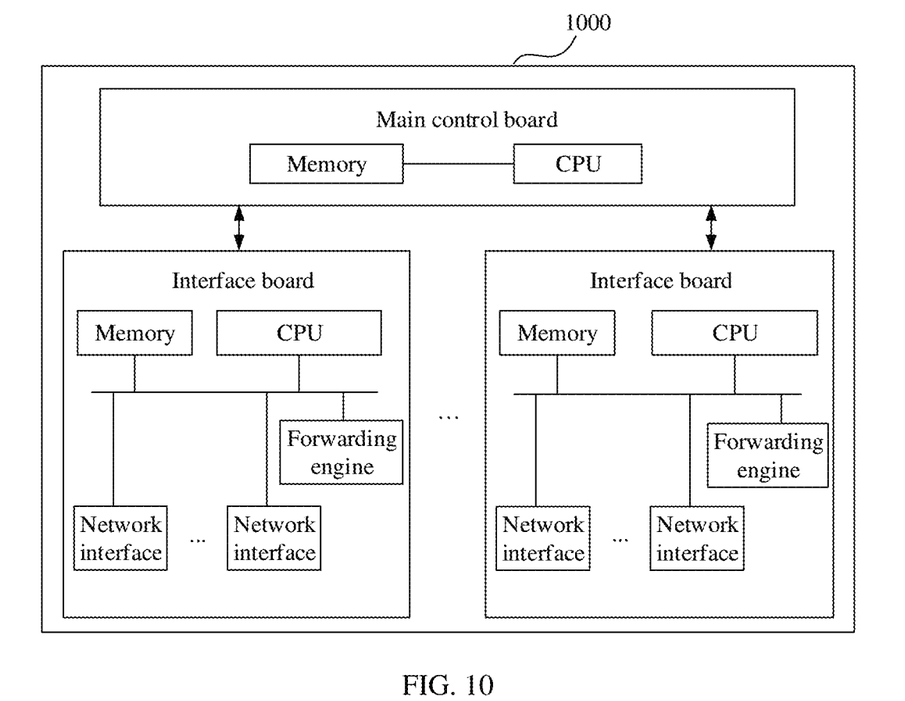
FIG. 10 is a schematic diagram of a structure of a device moo according to an embodiment of this application.

FIG. 10 is a schematic diagram of a structure of a device woo according to an embodiment of this application. The second device in FIG. 2 or FIG. 5 may be implemented by using the device shown in FIG. 10. Refer to the schematic diagram of the structure of the device shown in FIG. 10. The device moo includes a main control board and one or more interface boards. The main control board is communicatively connected to the interface board. The main control board is also referred to as a main processing unit (MPU) or a route processor card (route processor card). The main control board includes a CPU and a memory, and is responsible for controlling and managing each component in the device moo, including route computation, and device management and maintenance functions. The interface board is also referred to as a line processing unit (LPU) or a line card, and is configured to receive and send a packet. In some embodiments, the main control board communicates with the interface board through a bus, or the interface boards communicate with each other through a bus. In some embodiments, the interface boards communicate with each other through a switching board. In this case, the device woo also includes a switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding information table. The forwarding engine is configured to forward a received packet based on the forwarding information table stored in the memory. If a destination address of the received packet is an IP address of the device moo, the forwarding engine sends the packet to the CPU of the main control board or the CPU of the interface board for processing. If a destination address of the received packet is not an IP address of the device moo, the forwarding engine searches the forwarding information table based on the destination address. If a next hop and an outbound interface that correspond to the destination address are found from the forwarding information table, the forwarding engine forwards the packet to the outbound interface corresponding to the destination address. The forwarding engine may be a network processor (network processor, NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform a function of the forwarding engine, for example, implementing software forwarding based on a general-purpose CPU, so that no forwarding engine is required in the interface board. In some embodiments, the forwarding engine may be implemented by using an ASIC or a field programmable gate array (FPGA). In some embodiments, the memory that stores the forwarding information table may alternatively be integrated in the forwarding engine, and is used as a part of the forwarding engine.

An embodiment of this application further provides a chip system, including a processor, where the processor is coupled to a memory, and the memory is configured to store a program or instructions. When the program or the instructions are executed by the processor, the chip system is enabled to implement the method of the first device or the second device in the embodiment shown in FIG. 2 or FIG. 5.

Optionally, there may be one or more processors in the chip system. The processor may be implemented by using hardware, or may be implemented by using hardware. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated in a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processor (DSP), a micro controller unit (MCU), a programmable logic device (PLD), or another integrated chip.

It should be understood that steps in the foregoing method embodiments may be implemented by using a hardware integrated logical circuit in the processor or instructions in a form of software. The steps of the method disclosed with reference to the embodiments of this application may be directly performed and completed by a hardware processor, or may be performed and completed by using a combination of hardware in the processor and a software module.

An embodiment of this application further provides a computer-readable storage medium, including instructions. When the instructions are run on a computer, the computer is enabled to perform the method in the embodiments of this application.

In the specification, claims, and accompanying drawings of this application, the terms "first", "second", "third", "fourth", and the like are intended to distinguish similar objects but do not need to be used to describe a specific order or sequence. It should be understood that the data termed in such a way are interchangeable in proper circumstances so that the embodiments of the present invention described herein can be implemented in other orders than the order illustrated or described herein. Moreover, the terms "include", "have" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

In this application, "at least one" means one or more, and "a plurality of" means two or more. The term "at least one of the following items (pieces)" or an expression similar to the term indicates any combination of the items, and includes a single item (piece) or any combination of a plurality of items (pieces). For example, at least one of a, b, or c may indicate: a, b, c, a and b, a and c, b and c, or a, b, and c, where a, b, and c may be singular or plural. In this application, it is considered that "A and/or B" includes only A, only B, and A and B.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be obtained depending on actual requirements to achieve the objectives of the solutions in the embodiments.

In addition, module units in the embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module or unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose computer or a dedicated computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
obtaining, by a first device, geographical location information of the first device, and generating a first Internet Protocol version 6 (IPv6) packet, wherein the first IPv6 packet carries the geographical location information of the first device, and wherein the geographical location information of the first device is carried in a type-length-value (TLV), a tag field, or an arguments field of a segment identifier (SID) of a segment routing header (SRH); and
sending, by the first device, the first IPv6 packet.

2. The method according to claim 1, wherein
the geographical location information of the first device is carried in the arguments field of the SID of the SRH.

3. The method according to claim 1, wherein the geographical location information of the first device comprises one or more of the following:
longitude of the first device, latitude of the first device, or an identifier of an area in which the first device is located.

4. The method according to claim 1, wherein the geographical location information of the first device is carried in the TLV of the SRH.

5. The method according to claim 1, wherein the geographical location information of the first device is carried in the tag field of the SRH.

6. The method according to claim 1, wherein the geographical location information of the first device comprises a longitude of the first device.

7. The method according to claim 1, wherein the geographical location information of the first device comprises a latitude of the first device.

8. The method according to claim 1, wherein the geographical location information of the first device comprises an identifier of an area in which the first device is located.

9. A first device, comprising:
at least one processor; and
a non-transitory computer readable storage medium storing a program that is executable by the at least one processor, the program including instructions to:
obtain geographical location information of the first device, and generate a first Internet Protocol version 6 (IPv6) packet, wherein the first IPv6 packet carries the geographical location information of the first device, and wherein the geographical location information of the first device is carried in a type-length-value (TLV), a tag field, or an arguments field of a segment identifier (SID) of a segment routing header (SRH); and
send the first IPv6 packet.

10. The first device according to claim 9, wherein
the geographical location information of the first device is carried in the arguments field of the SID of the SRH.

11. The first device according to claim 9, wherein the geographical location information of the first device comprises one or more of the following:
longitude of the first device, latitude of the first device, or an identifier of an area in which the first device is located.

12. The first device according to claim 9, wherein the geographical location information of the first device is carried in the TLV of the SRH.

13. The first device according to claim 9, wherein the geographical location information of the first device is carried in the tag field of the SRH.

14. A non-transitory computer readable storage medium storing a program that is executable by a processor, the program including instructions to:
obtain geographical location information of a first device, and generate a first Internet Protocol version 6 (IPv6) packet, wherein the first IPv6 packet carries the geographical location information of the first device, and wherein the geographical location information of the first device is carried in a type-length-value (TLV), a tag field, or an arguments field of a segment identifier (SID) of a segment routing header (SRH); and
send the first IPv6 packet.

15. The non-transitory computer readable storage medium according to claim 14, wherein
the geographical location information of the first device is carried in the arguments field of the SID of the SRH.

16. The non-transitory computer readable storage medium according to claim 14, wherein the geographical location information of the first device is carried in the TLV of the SRH.

17. The non-transitory computer readable storage medium according to claim 14, wherein the geographical location information of the first device is carried in the tag field of the SRH.

* * * * *